United States Patent

Sood et al.

(10) Patent No.: US 9,851,272 B2
(45) Date of Patent: Dec. 26, 2017

(54) PRESSURE SENSOR DIAPHRAGM

(71) Applicant: Viatran Corporation, Wheatfield, NY (US)

(72) Inventors: Surinder Sood, West Seneca, NY (US); Joel D. Neri, Youngstown, NY (US); William Wilson, Tonawanda, NY (US)

(73) Assignee: Viatran Corporation, Tonawanda, NY (US)

( * ) Notice: Subject to any disclaimer, the term of this patent is extended or adjusted under 35 U.S.C. 154(b) by 151 days.

(21) Appl. No.: 14/615,933

(22) Filed: Feb. 6, 2015

(65) Prior Publication Data

US 2016/0231186 A1 Aug. 11, 2016

(51) Int. Cl.
*G01L 9/04* (2006.01)
*G01L 9/00* (2006.01)

(52) U.S. Cl.
CPC ......... *G01L 9/0055* (2013.01); *G01L 9/0044* (2013.01)

(58) Field of Classification Search
CPC ............................ G01L 9/0042; G01L 9/0051
USPC .................... 73/723, 726, 727, 862.636, 715
See application file for complete search history.

(56) References Cited

U.S. PATENT DOCUMENTS

| | | |
|---|---|---|
| 3,289,134 A | 11/1966 | Laimins et al. |
| 3,305,818 A | 2/1967 | Brueggeman et al. |
| 3,624,714 A | 11/1971 | Frassrand |
| 4,207,551 A | 6/1980 | Kautzky |
| 4,462,258 A | 7/1984 | Boddy |
| 4,691,573 A | 9/1987 | Varnum et al. |
| 5,115,676 A | 5/1992 | Lee |
| 5,438,876 A | 8/1995 | Lewis |
| 5,461,922 A | 10/1995 | Koen |
| 5,545,461 A | 8/1996 | Takeuchi et al. |
| 5,874,679 A | 2/1999 | Sokn |
| 6,117,086 A | 9/2000 | Shulze |
| 6,820,490 B2 | 11/2004 | Mittelstein et al. |
| 6,931,933 B2 | 8/2005 | Wilson |
| 7,086,288 B2 | 8/2006 | Lee et al. |
| 7,188,529 B2 | 3/2007 | Ooshiba et al. |
| 7,404,328 B2 | 7/2008 | Matsui |
| 7,661,317 B2 | 2/2010 | Kurtz et al. |
| 8,020,448 B2 | 9/2011 | Schlag |

(Continued)

FOREIGN PATENT DOCUMENTS

| | | |
|---|---|---|
| DE | 3219404 A1 | 11/1983 |
| DE | 4024780 A1 | 10/1991 |

(Continued)

OTHER PUBLICATIONS

[No Author Listed], Model MP40. Product data sheet. Althen GmbH Mess- und Sensortechnik, Apr. 27, 2006. 2 pages.

(Continued)

*Primary Examiner* — Lisa Caputo
*Assistant Examiner* — Roger Hernandez-Prewitt
(74) *Attorney, Agent, or Firm* — Wolf, Greenfield & Sacks, P.C.

(57) ABSTRACT

A pressure sensor includes a pre-formed diaphragm located at the distal end of a pressure sensor. The diaphragm has a convex surface on a first side of the diaphragm which is exposed to a fluid to be measured. A strain gauge is attached to a second surface on the opposite side of the diaphragm. The diaphragm may be deformed to have the convex curvature on the first surface, and heat treated.

14 Claims, 7 Drawing Sheets

(56) References Cited

U.S. PATENT DOCUMENTS

| | | | |
|---|---|---|---|
| 8,413,518 | B2 | 4/2013 | Kummer et al. |
| 8,434,369 | B2 | 5/2013 | Hou et al. |
| 2004/0211251 | A1* | 10/2004 | Lee et al. ............... H04R 7/00 73/146.3 |
| 2006/0137457 | A1* | 6/2006 | Zdeblick ............. A61B 5/0215 73/715 |
| 2010/0054916 | A1* | 3/2010 | Zheng et al. ......... G01L 9/0058 415/118 |
| 2011/0192212 | A1* | 8/2011 | Delprat et al. ......... F03D 17/00 73/12.01 |
| 2013/0042692 | A1 | 2/2013 | Fini et al. |
| 2014/0209220 | A1 | 7/2014 | Otomo et al. |

FOREIGN PATENT DOCUMENTS

| | | |
|---|---|---|
| EP | 0 352 773 A2 | 1/1990 |
| EP | 0 701 112 A2 | 3/1996 |

OTHER PUBLICATIONS

[No Author Listed], Blender Discharge Pressure Transmitter—Model 340 Series. Product data sheet. Dated Mar. 12, 2014. 2 pages.

[No Author Listed], Flush Mount Canbus Pressure Transmitter—Model 540 Series. Product data sheet. Dated Mar. 13, 2014. 2 pages.

[No Author Listed], Transmitter for Pressure & Temperature ATM/T. Process Measurement & Controls, Inc. STS Sensors. Product data sheet. Published at least as of Feb. 6, 2015. Available at http://www.sts-sensors.com/us/Home/Products/Pressure/tabid/401/Default.aspx [last accessed Apr. 22, 2015]. 2 pages.

[No Author Listed], TPF Flush Diaphragm Pressure Transducer. Product data sheet. GEFRAN spa. Published at least as of Feb. 6, 2015. Available at http://gefran-online.com/tpf-pressure-transducer-with-flush-measurement-diaphragm.html. [last accessed Apr. 22, 2015]. 4 pages.

[No Author Listed], MP402 Pressure transmitter. Product data sheet. Micron Instruments. Date Issued May 2005. 2 pages.

[No Author Listed], "Non-Oil Filled" Flush Diaphragm Sensor. FL Series—Flush Industrial Pressure Transmitter. Product data sheet. Dylix Corporation. Published at least as of Feb. 6, 2015. Available at http://www.dylixcorp.com/Products/SanitaryFlushDiaphragm/FLSeries.aspx [last accessed Apr. 22, 2015]. 2 pages.

[No Author Listed], FP110 Flush Diaphragm Pressure Transducer. Product data sheet. Measurement Specialties. Dated Mar. 5, 2014. 4 pages.

[No Author Listed], Series FT11XX—Miniature Flush Diaphragm Pressure Transducers. Product data sheet. Stellar Technology Incorporated. Copyright 2006. 2 pages.

[No Author Listed], Series FT26XX—Miniature Flush Diaphragm Pressure Transducer. Product data sheet. Stellar Technology Incorporated. Copyright 2007. 2 pages.

[No Author Listed], Series FT29XX—Flush Diaphragm Pressure Transducers and Pressure Transmitters. Product data sheet. Stellar Technology Incorporated. Copyright 2010. 2 pages.

[No Author Listed], Series FT260—Miniature Flush Diaphragm Pressure Transducer. Product data sheet. Stellar Technology Incorporated. Copyright 2007. 2 pages.

[No Author Listed], Series FT290—Flush Diaphragm Pressure Transducers. Product data sheet. Stellar Technology Incorporated. Copyright 2007. 2 pages.

[No Author Listed], TPFADA Flush Diaphragm Pressure Transmitter With Digital Autozero & Span. Product data sheet. GEFRAN spa. Published at least as of Feb. 6, 2015. Available at http://www.gefran.com/getfile.aspx?id=1479&lang=en [last accessed Apr. 22, 2015]. 5 pages.

[No Author Listed], Industrial Pressure Transmitter TKDA/TPSADA/TPFADA/TPHADA Series. Operating Manual Digital Autozero & Span Option. GEFRAN spa. Dated Jan. 3, 2011. 3 pages.

[No Author Listed], Model KX Flush Mount Pressure Transducer. Product data sheet. Ashcroft. 2007. 2 pages.

[No Author Listed], MHP320—Flush Mount Transducer. Industrial Pressure Transducers—Flush Mount. Product data sheet. MPI Pressure. Published at least as of Feb. 6, 2015. Available at www.mpipressure.com/upload/file/mhp320_flush_brochure.pdf [last accessed Apr. 22, 2015]. 1 page.

[No Author Listed], Model A-205. Flush Diaphragm Pressure Transducer. Product data sheet. Honeywell. Dated May 2008. 4 pages.

[No Author Listed], Model A-205. Flush Diaphragm High Level Output Pressure Transducer. Product data sheet. Honeywell. Dated May 2008. 4 pages.

[No Author Listed], Dynisco Model PT311JA. Flush Diaphragm Pressure Transducer. Product data sheet. Dynisco. Published at least as of Feb. 6, 2015. Available at http://www.dynisco.com/stuff/contentmgr/files/1/2dd25163e059fa6bc9fbad70893e0596/pdf/pt311ja_series_flush_mounted_pressure_transducer.pdf [last accessed Apr. 22, 2015]. 2 pages.

[No Author Listed], Dynisco Model PT375. Flush Diaphragm High Pressure Transducer. Product data sheet. Dynisco. Published at least as of Feb. 6, 2015. Available at http://www.viatran.com/stuff/contentmgr/files/1/cb08677d85f38d085d31aceeb86e83a9/pdf/pt375_data_sheet.pdf [last accessed Apr. 22, 2015]. 2 pages.

[No Author Listed], Flush Diaphragm Millivolt Output Pressure Transducer—PX102 Series. Product data sheet. Published at least as of Feb. 6, 2015. Available at http://www.omega.com/Pressure/pdf/PX102.pdf [last accessed Apr. 22, 2015]. 1 page.

[No Author Listed], Pressure Transducer—Model XPMD DynAstat. Product data sheet. Tecsis LP. Published at least as of Feb. 6, 2015. Available at http://www.tecsis.us/fileadmin/Content/tecsisLP/2_Files/2_Pressure/XPMD-DynAstat-Pressure-Transducer.pdf [last accessed Apr. 22, 2015]. 1 page.

[No Author Listed], Subminiature Pressure Transducer—Model XPMF03. Product data sheet. Tecsis LP. Published at least as of Feb. 6, 2015. Available at http://www.tecsis.us/fileadmin/Content/tecsisLP/2_Files/2_Pressure/XPMF03-Flush-Diaphragm-Pressure-Transducer.pdf [last accessed Apr. 22, 2015]. 1 page.

[No Author Listed], Miniature Pressure Transducer—Model XPMF04. Product data sheet. Tecsis LP. Published at least as of Feb. 6, 2015. Available at http://www.tecsis.us/fileadmin/Content/tecsisLP/2_Files/2_Pressure/XPMF04-Flush-Diaphragm-Pressure-Transducer.pdf [last accessed Apr. 22, 2015]. 1 page.

[No Author Listed], Miniature Pressure Transducer—Model XPMF05. Product data sheet. Tecsis LP. Published at least as of Feb. 6, 2015. Available at http://www.tecsis.us/fileadmin/Content/tecsisLP/2_Files/2_Pressure/XPMF05-Flush-Diaphragm-Pressure-Transducer.pdf [last accessed Apr. 22, 2015]. 1 page.

* cited by examiner

PRESSURE SENSOR DIAPHRAGM

FIELD

Disclosed embodiments relate generally to pressure sensors, and particularly to pressure sensors which provide improved stability over time.

DISCUSSION OF THE RELATED ART

Pressure sensors are employed in various applications to monitor the pressure of fluids. Typical pressure sensors include a diaphragm with an associated structure for measuring displacements of the diaphragm in response to changes in the fluid pressure. For example, many pressure sensors include a resistive strain gauge on a surface of the diaphragm capable of converting a mechanical displacement of the diaphragm into an electrical signal.

In conventional pressure sensor designs, the diaphragm is disposed in a recessed pressure port. Flush mountable pressure sensors are also known in which the diaphragm forms the distal end of a sensor.

SUMMARY

In one embodiment, a method for manufacturing a pressure sensor diaphragm includes deforming the diaphragm such that a first surface on a first side of the diaphragm has a convex curvature, and a second surface on a second, opposite side of the diaphragm has a concave curvature. The method further includes attaching a strain gauge to the second surface of the diaphragm.

In another embodiment, a pressure sensor diaphragm comprises a pre-formed metal diaphragm having a first surface on a first side of the diaphragm, and a second surface on a second, opposite side of the diaphragm, wherein the first surface has a convex curvature and the second surface has a concave curvature. A strain gauge is attached to the second surface of the diaphragm.

In yet another embodiment, a pressure sensor having a proximal end and a distal end comprises a housing having a proximal end and a distal end and a pre-formed metal diaphragm having a first surface on a first side of the diaphragm, and a second surface on a second, opposite side of the diaphragm. The diaphragm is attached to the distal end of the housing and arranged such that the first surface of the diaphragm defines the distal end of the pressure sensor and the second surface is oriented toward an interior space of the housing. The first surface of the diaphragm has a convex curvature and the second surface of the diaphragm has a concave curvature. The pressure sensor also includes a strain gauge attached to the second surface of the diaphragm and a lead electrically coupled to the strain gauge and extending along the interior space of the housing.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
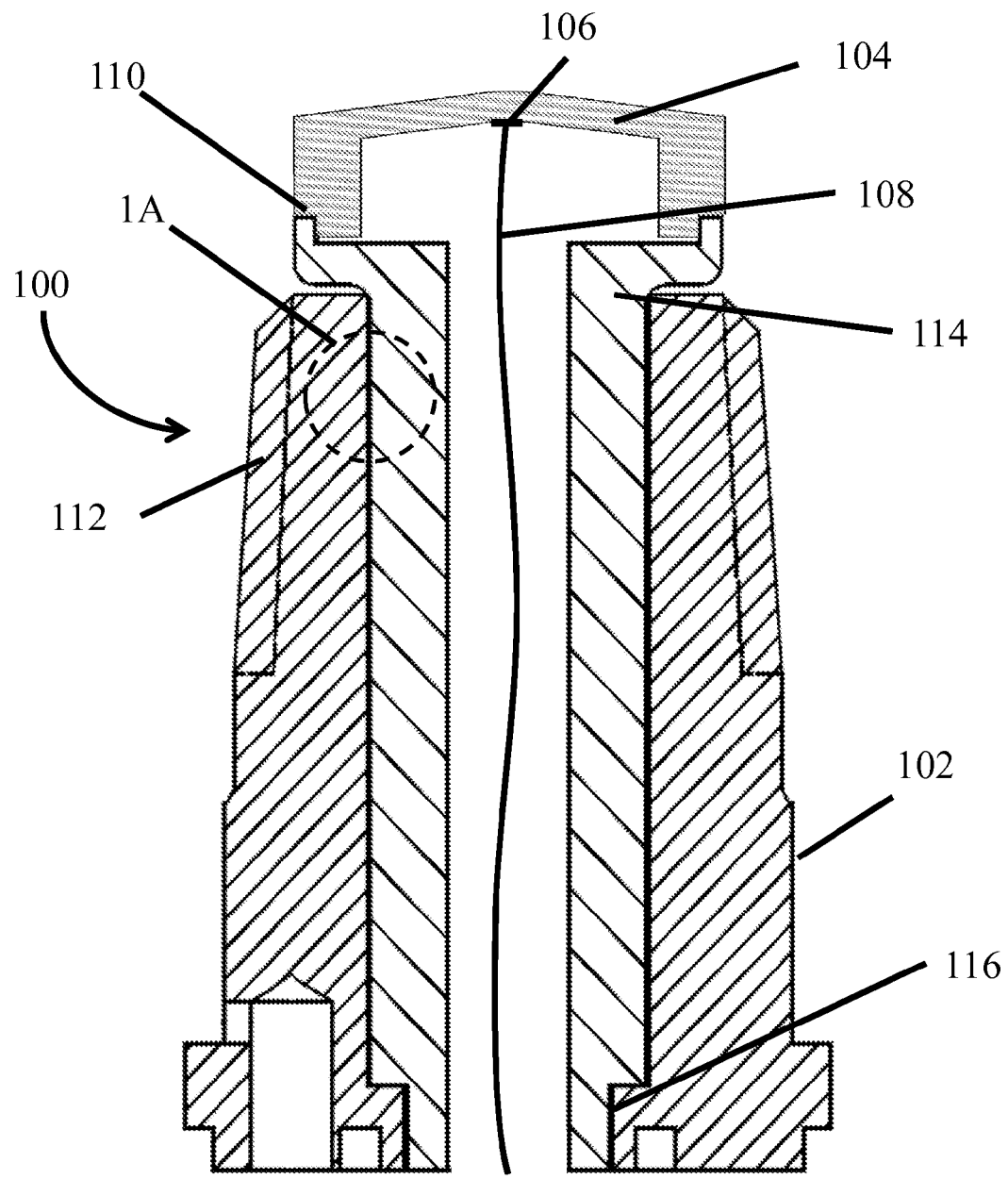
FIG. 1 is a schematic cross-sectional view of a flush mountable pressure sensor assembly.

The inventors have found that pressure sensors employing certain diaphragm designs may be unstable and may exhibit poor or unreliable performance over time. This degradation in performance is found to occur in some cases even while a sensor is not in use, and it may be particularly exacerbated in flush mountable pressure sensors. For example, over time, the calibrated zero value of a sensor may drift out of specification, leading to inaccurate pressure measurements. Such instability in sensor performance often results from residual stresses in the sensor diaphragm that are introduced during manufacturing; in many cases the sensor design does not allow the diaphragm to be thermally stress relieved after assembly. This problem is particularly prominent in applications in which a pressure sensor is required to have a high proof pressure. The proof pressure is herein defined as the maximum pressure that a sensor may be exposed to without damaging the sensor or affecting its calibration, and is typically expressed as a multiple of the operating range of the sensor. In typical applications, a sensor may not be exposed to pressures which exceed 1.5 times the operating range of the sensor, and thus pressure sensors are commonly designed to have a 1.5× proof pressure. However, in applications in which large pressure spikes are common, such as those in which cavitation is likely, pressure levels may spike to upwards of 5 times the operating range of the sensor. Thus, in such applications, a sensor is typically designed with at least a 5× proof pressure requirement. The inventors have discovered that typical pressure sensor designs using conventional arrangements are unable to satisfy these high proof pressure requirements while maintaining a stable sensor output over time.

The inventors have recognized the need to provide a pressure sensor capable of maintaining an accurate pressure measurement and providing increased reliability while also satisfying a high proof pressure requirement. Disclosed herein are embodiments of pressure sensors capable of maintaining an accurate pressure measurement and providing increased reliability while also satisfying a high proof pressure requirement. In particular improved diaphragm arrangements are discussed for use in pressure sensors, including flush mountable pressure sensors.

According to one aspect of the present disclosure, a pressure sensor having a distal end and a proximal end includes a metal diaphragm disposed at the distal end. The diaphragm includes an active portion which has a first surface on a first side of the diaphragm arranged to be exposed to a fluid, and a second surface on an opposite side of the diaphragm facing the interior of the sensor. The diaphragm is pre-formed before being attached to a pressure sensor housing such that the first surface is convex and generally bulges outward from the distal end of the sensor. Such a configuration imparts increased strength and rigidity to the diaphragm and thus improves the mechanical stability of the diaphragm compared to a conventional flat diaphragm design. This improved mechanical stability may allow the sensor to be used in applications requiring a high proof pressure; however, the sensor also may be used in applications without a high proof pressure requirement, as the disclosure is not so limited. The sensor further includes a strain gauge which is bonded to the second surface of the diaphragm, and is arranged to measure deformation of the diaphragm in response to pressure applied to the first surface of the diaphragm.

The pre-formed diaphragm described above may include any suitable convex shape of the first surface. For example, the first, outer surface of the diaphragm may have a conical shape with a rounded portion in the center of the diaphragm. Alternatively, the first surface may have a continuous convex curvature, or any other suitable shape such that the first surface is convex. The degree of convexity of the first surface may be defined by a displacement at the center of diaphragm relative to a hypothetical flat diaphragm configuration on the same housing. For example, the deformation the center of the diaphragm may be in the range of 0.0508 mm (0.002 inches) to 0.254 mm (0.010 inches); however other deformation ranges are possible as the disclosure is not so limited. Depending on the embodiment, the second, interior surface of the diaphragm may include a concave curvature with a profile which generally matches that of the first surface.

In certain embodiments, the perimeter of the diaphragm may have a circular shape. Such a shape may be desirable in order to provide a diaphragm with a uniform and symmetrical response. Additionally, a circular shape does not contain corners which may act as stress concentrators and contribute to performance degradation or sensor failure. However, the perimeter of the diaphragm may have any suitable shape as the disclosure is not so limited. For example, the perimeter of the diaphragm may have an elliptical shape, a polygonal shape with corners connecting a plurality of linear boundary portions of the polygon, or the shape could include a combination of rounded portions and linear portions.

In some embodiments, a pressure sensor may be a flush mountable pressure sensor. In such embodiments, the first surface of the diaphragm may define the distal end of the sensor such that no other portion of the sensor, such as the sensor housing, extends beyond the diaphragm. Such pressure sensors may thus be mounted substantially flush with an inner surface of a pipe or other appropriate vessel containing a fluid. Flush mountable arrangements are particularly useful for applications involving viscous fluids or fluids which are otherwise prone to clogging, since such flush mountable pressure sensors do not feature a recessed pressure port in which fluid may become trapped. Flush mountable pressure sensors are also easier to clean, resulting in less down time for cleaning and maintenance.

As described above, a pressure sensor may include a strain gauge attached to the second surface of the diaphragm. In some embodiments, the strain gauge may be a resistive strain gauge; in such embodiments, the strain gauge may comprise a plurality of resistive elements arranged in a Wheatstone Bridge configuration. The strain gauge may be arranged to measure deformation of the diaphragm in response to changes in pressure applied to the diaphragm. As such, the combination of a diaphragm and a strain gauge attached to the diaphragm may constitute a pressure sensor. The strain gauge may be attached to conducting electrical leads which may transmit a signal (e.g. a change in resistance corresponding to a deformation) to a remote location, such as a proximal end of a sensor housing. Alternative methods and devices to measure the deformation of the diaphragm may include piezoresistive elements, capacitive elements, optical elements, or any other suitable mechanism to measure the deformation of the diaphragm, as the disclosure is not so limited.

According to another aspect of the disclosure, a method of manufacturing a pressure sensor diaphragm includes providing a diaphragm having a first surface on a first side of the diaphragm, and a second surface on a second, opposite side of the diaphragm, and deforming the diaphragm such that the first surface is convex. During deforming, the shape of the diaphragm is permanently changed such that at least a portion of the first surface bulges outwardly and the first surface becomes generally convex. In some embodiments, deforming the diaphragm in this manner also may include changing the shape of the second surface such that the second shape is generally concave. For example, the second surface may have a profile which matches the profile of the first surface. Alternatively, the second surface may not be concave, or it may have a profile that is different than the first surface. The method may further include heat treatment to reduce residual stresses resulting from the deforming process; however, no heat treatment is required in some embodiments, as the disclosure is not so limited. A strain gauge is attached to the second surface of the diaphragm, and is arranged to measure deformation of the diaphragm.

In some embodiments, deforming the diaphragm includes mechanical forming. For example, a custom die set may be constructed and arranged in order to permanently deform a diaphragm into a pre-formed convex diaphragm according to the present disclosure. In one embodiment, a die set may comprise a first die, a second die, and a forming ball disposed within a cavity in the first die. A flush tip diaphragm may be positioned between the two dies such that when no force is applied, a gap exists between the two dies. When a compressive force is applied to the dies, the forming ball presses into the center of the diaphragm and deforms the diaphragm into a convex shape, and the first die and second die are brought into contact. In such an embodiment, the amount of deformation applied to the diaphragm may be controlled. In this manner, the degree of convexity of the formed diaphragm may be controlled by designing the die set to have a predetermined gap size between the dies before any force is applied.

Turning now to the figures, several nonlimiting embodiments are described in further detail. While specific embodiments are described below, it should be understood that the various components, systems, and methods of operation described herein may be combined in any desirable fashion as the current disclosure is not so limited. For the sake of clarity, the current disclosure describes a flush mountable pressure sensor, and in particular, diaphragms for flush mountable pressure sensors. However, it should be understood that the current disclosure is not limited to flush mountable pressure sensors and pressure sensor diaphragms. Instead, the convex diaphragm embodiments disclosed herein are capable of being used in any number of different pressure sensing applications, including those with a typical recessed pressure port design.

FIG. 1 shows an embodiment of a flush mountable pressure sensor assembly 100. The assembly includes a housing 102, a diaphragm 104 attached to a distal end of the housing, a strain gauge 106 attached to the interior surface of the diaphragm, and an electrical lead 108. The electrical lead 108 is attached to the strain gauge 106 and directed along the interior of the sensor housing 102 toward a proximal end of the assembly. In some embodiments, the sensor 100 may be fully sealed so as to prevent fluid ingress into the interior of the sensor which could damage various components of the sensor. For example, the diaphragm 104 may be welded to the sensor housing around at an interface 110 so as to provide such a fluid-tight seal. However, the sensor may not be sealed in some embodiments, as the disclosure is not so limited.

The sensor housing also may include an attachment mechanism 112 constructed and arranged to allow the sensor assembly 100 to be attached to a vessel containing a fluid. For example, the attachment mechanism 112 may include a threaded interface arranged to be screwed into a complementary port in a wall of a vessel. In some embodiments, it may be advantageous for the attachment mechanism 112 to provide a fluid-tight seal with a wall of a vessel to reduce the chance of fluid leaking out of the vessel at the sensor attachment point. Alternatively, the attachment mechanism may be an interference fit or any other suitable mechanism as the disclosure is not so limited.

Figure 1A:
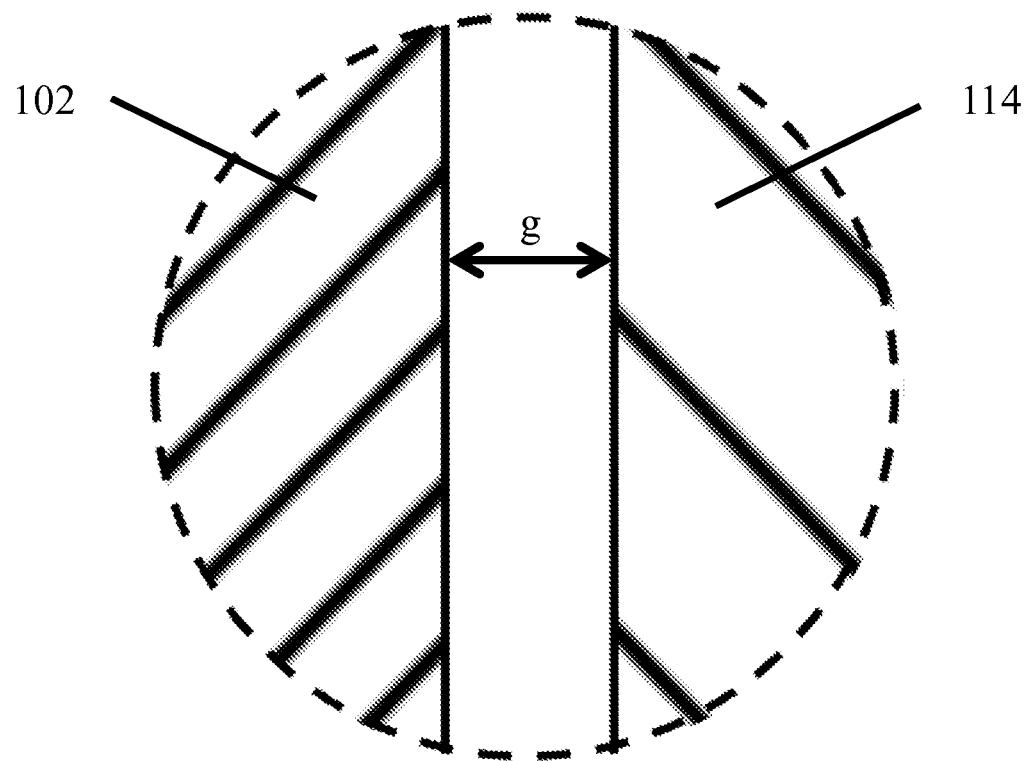
FIG. 1A is an enlarged view of the area encircled by line 1A of FIG. 1.

In certain embodiments, the housing may further include a sensor isolator 114 arranged to decouple torque which may be applied to the housing, for example, to the attachment mechanism 112, from the diaphragm. Such torque may be applied to the housing during installation of a sensor into a vessel, and transfer of torque between the housing and the diaphragm may lead to undesirable deformation of the diaphragm which could introduce error into a measurement or damage the sensor. As shown in FIG. 1, a proximal end of a sensor isolator 114 is attached to the sensor housing 102 via an interface 116, and the diaphragm is attached to a distal end of the sensor isolator. The interface 116 may comprise a welded interface, an interference fit, an adhesive attachment, or any other suitable means for attaching the proximal portion of the sensor isolator to the housing. In the depicted embodiment, no other portions of the sensor isolator or diaphragm are attached to the housing, and the sensor isolator and attached diaphragm are suspended in the housing. FIG. 1A shows an enlarged view of the area encircled by line 1A of FIG.1, illustrating that such an attachment configuration may allow for a gap to be formed between the sensor isolator 114 and the housing 102 which may contribute to the reduction in torque transfer by limiting the physical contact between the sensor isolator and the housing. In some embodiments, the gap may have a dimension g in the range of about 0.0254 mm (0.001 inches) to 0.0762 mm (0.003 inches) inclusive; however, other dimensions also may be suitable, as the disclosure is not so limited. In another embodiment, the sensor isolator and/or the housing may have a tapered geometry and the dimension g of the gap may vary along the length of the sensor. For example, the gap may have a first smaller dimension at the proximal end of the sensor, and increase to a larger dimension at the distal end of the sensor.

Figure 2:
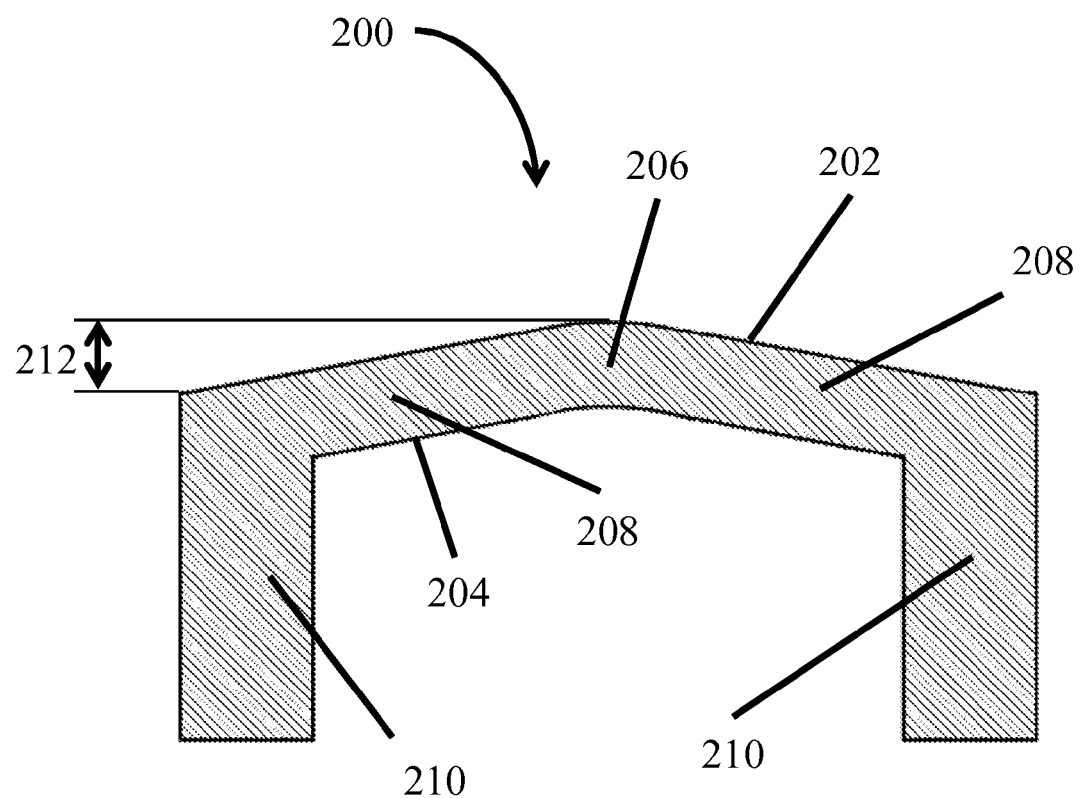
FIG. 2 is a schematic cross-sectional view of one embodiment of a pressure sensor diaphragm.

FIG. 2 shows an embodiment of a pre-formed convex diaphragm 200 for use in a flush mountable pressure sensor. The diaphragm has a first surface 202 on a first side of the diaphragm arranged to be exposed to a fluid, and a second surface 204 on a second, opposite side of the diaphragm. As shown in the figure, the first surface of the diaphragm has a convex shape, and the second surface has a concave shape which follows the profile of the first surface. As described above, this configuration may improve the mechanical strength and rigidity of the diaphragm, and thus enable a sensor to be used in applications which require a high proof pressure, while still providing accurate and reliable performance. The diaphragm depicted in FIG. 2 features a rounded portion 206 at the center of the diaphragm, and straight, non-curved sections 208 at the periphery of the diaphragm, forming a diaphragm having a cone-like shape with a rounded tip. The diaphragm may further include a support structure 210 constructed and arranged to support the diaphragm and allow the diaphragm to be attached to a sensor housing 102. In some embodiments, a deflection 212 at the center of the diaphragm may be in the range of 0.0508 mm (0.002 inches) to 0.254 mm (0.010 inches) inclusive.

Figure 3:
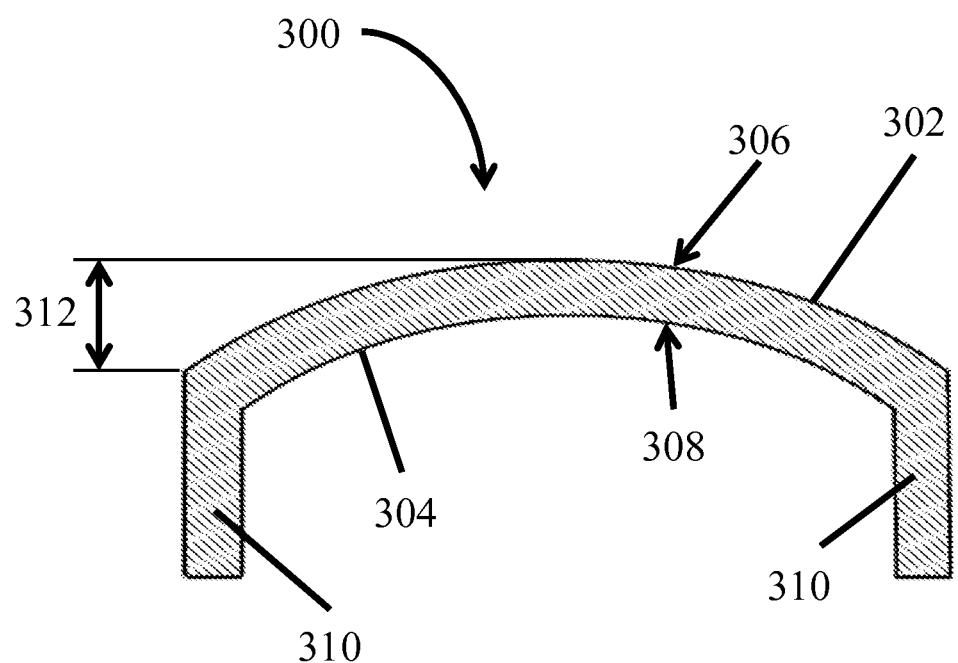
FIG. 3 is a schematic cross-sectional view of another embodiment of a pressure sensor diaphragm.

FIG. 3 depicts another embodiment of a pre-formed convex diaphragm 300 which may be implemented in a flush mountable pressure sensor or other suitable pressure sensory. The diaphragm includes a first surface 302 on a first side of the diaphragm arranged to be exposed to a fluid, and a second surface 304 on a second, opposite side of the diaphragm. The first surface 302 has a convex curvature across the entire surface. In some embodiments the curvature of the first surface 302 may be defined by a constant radius of curvature 306 across the entire first surface such that the shape of the first surface is a spherical cap. Alternatively, the curvature of the first surface may vary across the diaphragm in some embodiments, as the disclosure is not so limited. As shown in the figure, the curvature 308 of the second surface 304 may match the curvature of the first surface such that the diaphragm thickness is constant. Alternatively, the second surface 304 may have no curvature or a different curvature than the first surface 302. The diaphragm may further include a support structure 310 constructed and arranged to support the diaphragm and allow the diaphragm to be attached to a sensor housing 102. In some embodiments, a deflection 312 at the center of the diaphragm may be in the range of 0.0508 mm (0.002 inches) to 0.254 mm (0.010 inches) inclusive.

A pre-formed diaphragm according to the present disclosure may have a thickness in the range of 0.254 mm (0.010 inches) to 1.067 mm (0.042inches) inclusive. The particular thickness used may depend on a desired pressure range and a desired proof pressure. Table 1 provides examples of diaphragm thicknesses suitable for various pressure ranges and proof pressures. However, other diaphragm thicknesses may be used as the disclosure is not so limited.

TABLE 1

| Pressure Range (PSI) | Proof Pressure (PSI) | Diaphragm Thickness (mm) | Diaphragm Thickness (Inches) | Deflection (mm) | Deflection (Inches) |
| --- | --- | --- | --- | --- | --- |
| 0-50 | 250 | 0.2616 | 0.0103 | 0.0508-0.254 | 0.002-0.010 |
| 0-75 | 375 | 0.2896 | 0.0114 | 0.0508-0.254 | 0.002-0.010 |
| 0-100 | 500 | 0.3353 | 0.0132 | 0.0508-0.254 | 0.002-0.010 |

TABLE 1-continued

| Pressure Range (PSI) | Proof Pressure (PSI) | Diaphragm Thickness (mm) | Diaphragm Thickness (Inches) | Deflection (mm) | Deflection (Inches) |
| --- | --- | --- | --- | --- | --- |
| 0-150 | 750 | 0.4089 | 0.0161 | 0.0508-0.254 | 0.002-0.010 |
| 0-200 | 1000 | 0.4724 | 0.0186 | 0.0508-0.254 | 0.002-0.010 |
| 0-250 | 1250 | 0.5283 | 0.0208 | 0.0508-0.254 | 0.002-0.010 |
| 0-300 | 1500 | 0.5791 | 0.0228 | 0.0508-0.254 | 0.002-0.010 |
| 0-400 | 2000 | 0.6680 | 0.0263 | 0.0508-0.254 | 0.002-0.010 |
| 0-500 | 1500 | 0.7468 | 0.0294 | 0.0508-0.254 | 0.002-0.010 |
| 0-750 | 3750 | 0.9144 | 0.0360 | 0.0508-0.254 | 0.002-0.010 |
| 0-1,000 | 5000 | 1.057 | 0.0416 | 0.0508-0.254 | 0.002-0.010 |

A diaphragm support structure may include a side wall 210, 310 constructed and arranged to support the active portion of the diaphragm and to provide an interface for the diaphragm to be attached to a sensor housing (see FIGS. 2 and 3). For example, the side wall may be welded to a sensor housing such that a fluid-tight seal is formed between a diaphragm and a sensor housing. However, a welded interface between a diaphragm and a housing may not be fluid-tight in some embodiments, as the disclosure is not so limited. Alternatively, a diaphragm may be attached to a sensor housing via a screw fit, interference fit, or any other suitable attachment mechanism, as the disclosure is not so limited.

The above-described components may be made from any suitable combination of materials. For example, in some embodiments the components may be manufactured from a metal alloy which may provide high mechanical strength and corrosion resistance. Suitable metal alloys include iron alloys including 15-5 PH stainless steel and 17-4 PH stainless steel, nickel alloys including Inconel 718 and Inconel X-750, and titanium alloys including Ti-6Al-4V and Ti-3Al-2.5V. Alternatively, the components may be made from other iron alloys, nickel alloys, titanium alloys, aluminum or aluminum alloys, other metals, plastics, ceramics, or any other suitable material.

Figure 4A:
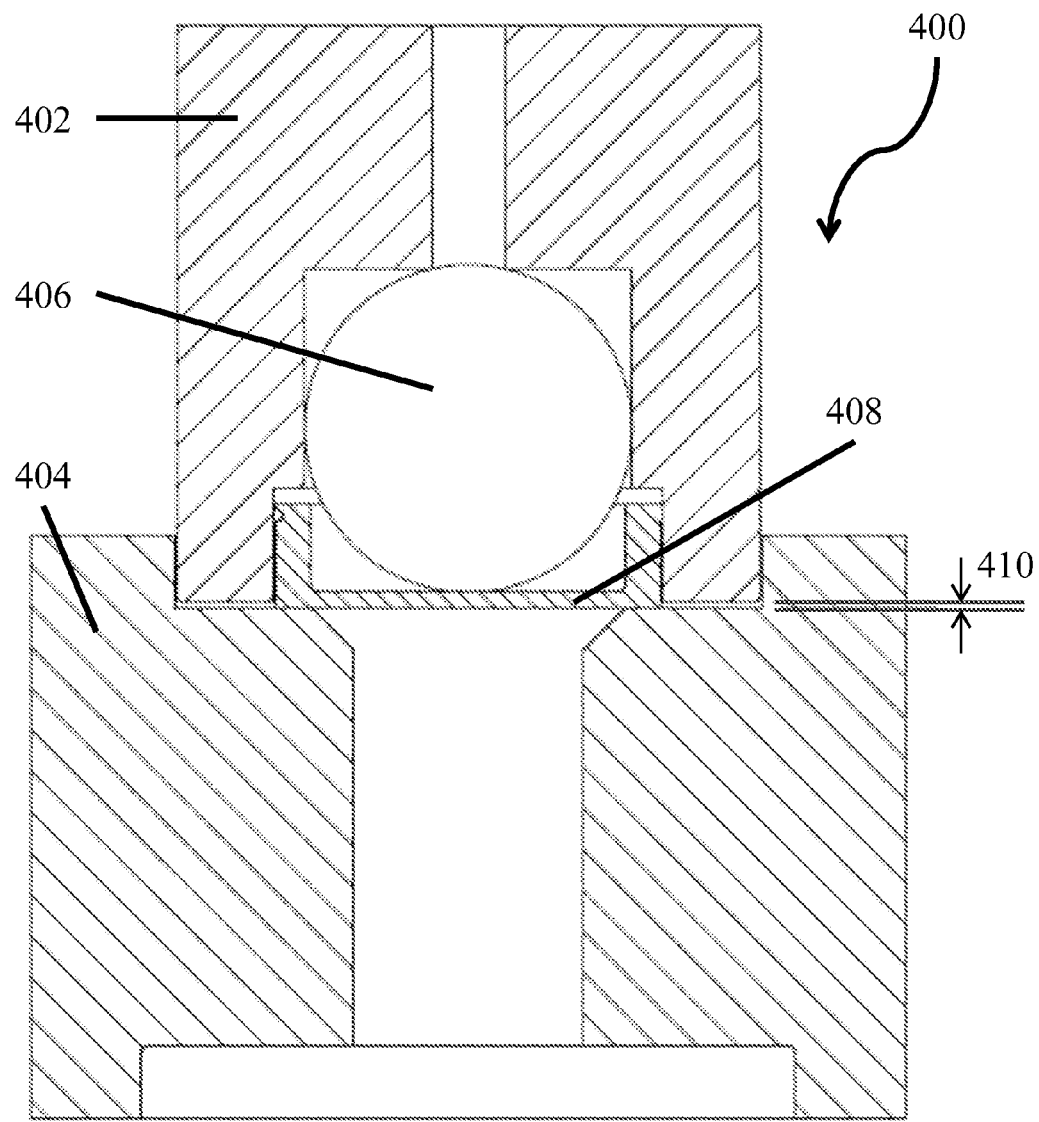
FIG. 4A is a schematic representation of a die set which may be used to form a convex diaphragm.
Figure 4B:
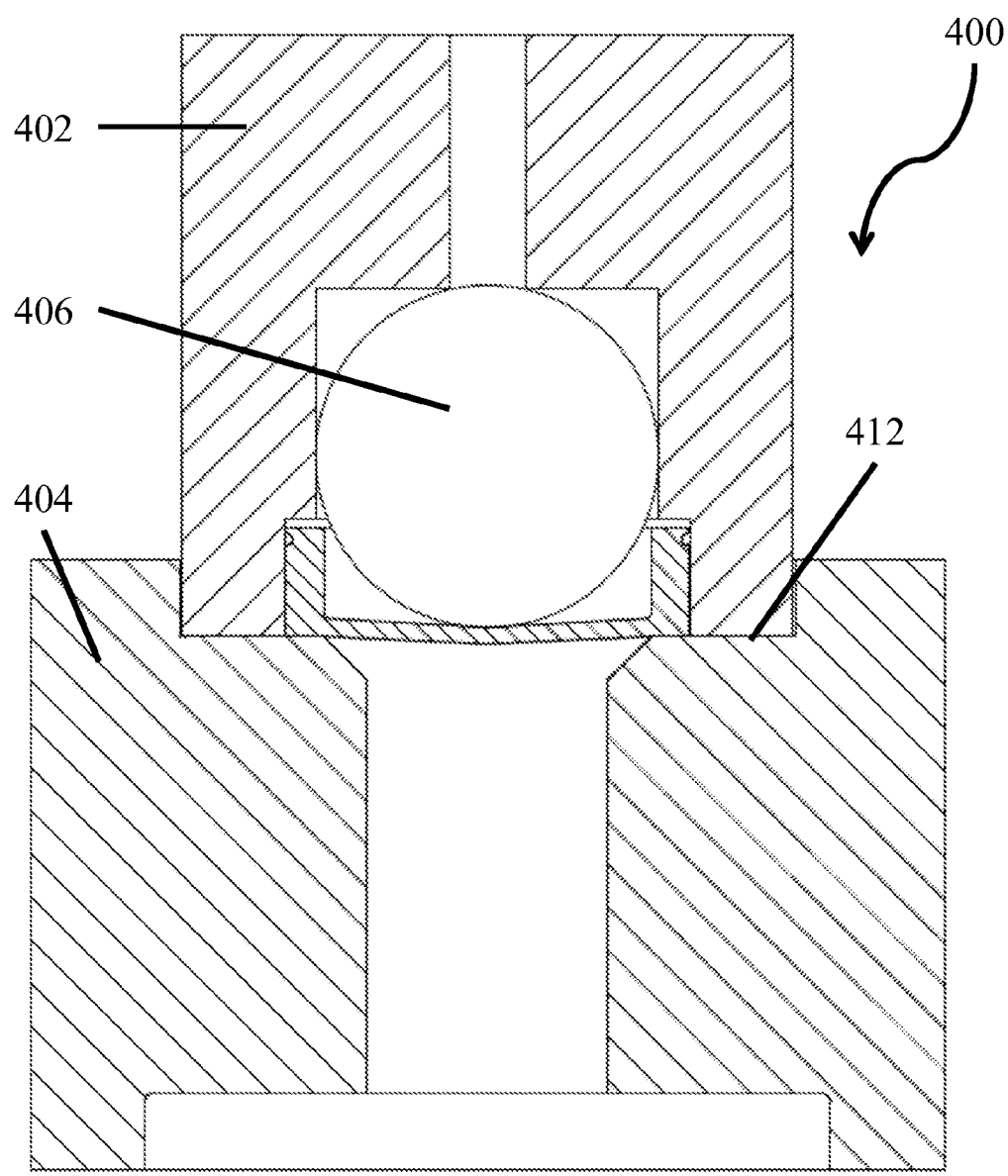
FIG. 4B is a schematic representation of the die set depicted in FIG. 4A after completion of the forming process.

FIG. 4A depicts an embodiment of a die set 400 which may be used to form a convex diaphragm according to the present disclosure. In this embodiment, the die set comprises a first die 402, a second die 404, and a forming ball 406. The dies are constructed and arranged to accept a conventional flat flush tip diaphragm 408, and to alter the diaphragm to form a convex diaphragm as described above upon application of force to the die set 400. The die set is sized such that when a diaphragm is disposed between the dies as depicted in the figure, a gap 410 of a predetermined size is present between the first die and the second die. As depicted in FIG. 4B, by applying a force to the first die, the diaphragm deforms and the first die and second die come into contact at interface 412. In this manner, the size of the gap 410 may be chosen such that a formed diaphragm has a desired deflection at the center. Depending on the particular embodiment, other suitable resulting configurations for the diaphragm also may be employed. For example, in one embodiment, a diaphragm may be deformed to have a conical shape with a point at the center of the diaphragm. In such an embodiment, the die set may include features configured as a cone and sized to achieve a desired deflection at the center of the diaphragm.

Figure 5:
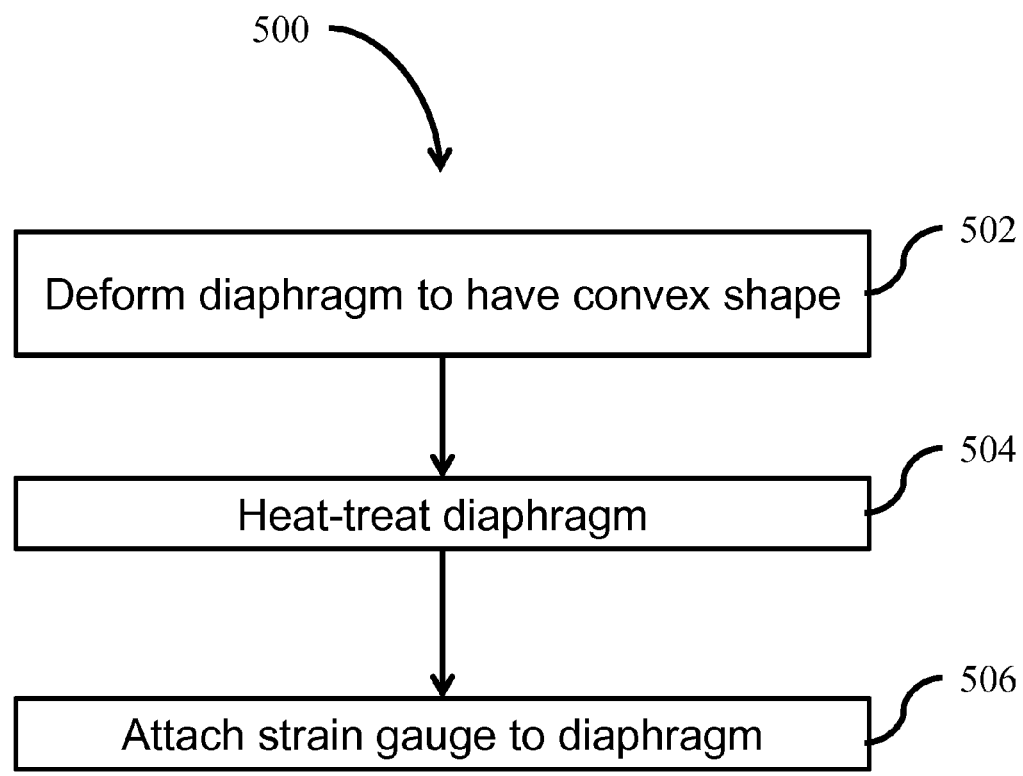
FIG. 5 is a flow chart depicting one embodiment of a method of manufacturing a pressure sensor diaphragm.

FIG. 5 is a flow chart of a method 500 of manufacturing a pre-formed convex diaphragm which may be subsequently used in a pressure sensor. A diaphragm is provided having a first surface and a second surface. At block 502, the diaphragm is deformed such that the shape of the diaphragm is permanently changed to have a convex shape as described above. In some embodiments, a diaphragm may be provided which has some initial convexity or other shape such that the diaphragm is not initially flat; in such embodiments, deforming may involve increasing the degree of convexity of the diaphragm such that the deflection at the center of the diaphragm is increased. At block 504, heat-treatment may next be performed; the heat-treatment may reduce residual stresses in the diaphragm which may be introduced from the forming process. At block 506, a strain gauge is subsequently attached to the second surface of the formed diaphragm. In some embodiments, a method of manufacturing a pressure sensor may include first manufacturing a pre-formed pressure sensor diaphragm, as described above, and subsequently attaching the pre-formed diaphragm to a pressure sensor housing. For example, a pre-formed diaphragm may include a support structure which may be welded to the sensor housing to form a fluid tight-seal between the diaphragm and the sensor housing.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A pressure sensor diaphragm comprising:
   a pre-formed metal diaphragm having a first surface on a first side of the diaphragm, and a second surface on a second, opposite side of the diaphragm, wherein the first surface has a convex curvature and the second surface has a concave curvature; and
   a strain gauge attached to the second surface of the diaphragm, wherein the strain gauge is operable to measure strain of the diaphragm when the strain gauge is attached to only the second surface of the diaphragm, and wherein the diaphragm has a maximum operable pressure of at least 50 pounds per square inch.

2. The pressure sensor diaphragm of claim 1, wherein the diaphragm is heat treated.

3. The pressure sensor diaphragm of claim 1, wherein a deflection at the center of the diaphragm in the range of 0.0508 mm (0.002 inches) to 0.254 mm (0.010 inches), inclusive, relative to an edge of the diaphragm.

4. The pressure sensor diaphragm of claim 1, wherein the strain gauge is a resistive strain gauge.

5. The pressure sensor diaphragm of claim 1, wherein the diaphragm has a maximum operable pressure of 1000 pounds per square inch or less.

6. The pressure sensor diaphragm of claim 1, wherein the diaphragm has a proof pressure of about five times the maximum operable pressure.

7. A pressure sensor comprising:
- a housing having a proximal end and a distal end;
- a pre-formed metal diaphragm having a first surface on a first side of the diaphragm, and a second surface on a second, opposite side of the diaphragm, the diaphragm being attached to the distal end of the housing, the diaphragm arranged such that the first surface defines a distal end of the pressure sensor and the second surface is oriented toward an interior space of the housing, wherein the first surface has a convex curvature and the second surface has a concave curvature;
- a strain gauge attached to the second surface of the diaphragm, wherein the strain gauge is operable to measure strain of the diaphragm when the strain gauge is attached to only the second surface of the diaphragm; and
- a lead electrically coupled to the strain gauge and extending along the interior space of the housing, wherein the pressure sensor has a maximum operable pressure of at least 50 pounds per square inch.

8. The pressure sensor of claim 7, wherein the diaphragm is heat treated.

9. The pressure sensor of claim 7, wherein the diaphragm is welded to the housing.

10. The pressure sensor of claim 7, wherein a deflection at the center of the diaphragm is in the range of 0.0508 mm (0.002 inches) to 0.254 mm (0.010 inches), inclusive, relative to an edge of the diaphragm.

11. The pressure sensor of claim 7, wherein the strain gauge is a resistive strain gauge.

12. The pressure sensor of claim 7, wherein the diaphragm is flush with the distal end of the housing.

13. The pressure sensor of claim 7, wherein the pressure sensor has a maximum operable pressure of 1000 pounds per square inch or less.

14. The pressure sensor of claim 7, wherein the pressure sensor has a proof pressure of about five times the maximum operable pressure.

* * * * *